(12) United States Patent
Da et al.

(10) Patent No.: US 11,940,549 B2
(45) Date of Patent: Mar. 26, 2024

(54) POSITIONING METHOD AND DEVICE

(71) Applicant: DATANG MOBILE COMMUNICATIONS EQUIPMENT CO., LTD., Beijing (CN)

(72) Inventors: Ren Da, Beijing (CN); Bin Ren, Beijing (CN); Deshan Miao, Beijing (CN); Hui Li, Beijing (CN); Xueyuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 264 days.

(21) Appl. No.: 17/422,200

(22) PCT Filed: Dec. 16, 2019

(86) PCT No.: PCT/CN2019/125755
§ 371 (c)(1),
(2) Date: Jul. 11, 2021

(87) PCT Pub. No.: WO2020/143403
PCT Pub. Date: Jul. 16, 2020

(65) Prior Publication Data
US 2022/0082652 A1    Mar. 17, 2022

(30) Foreign Application Priority Data

Jan. 11, 2019   (CN) .......................... 201910028366.2

(51) Int. Cl.
*G01S 5/00*    (2006.01)
*G01S 5/02*    (2010.01)
(Continued)

(52) U.S. Cl.
CPC ................ *G01S 5/10* (2013.01); *G01S 5/021* (2013.01); *G01S 5/0284* (2013.01); *H04W 64/003* (2013.01)

(58) Field of Classification Search
CPC .......... G01S 5/10; G01S 5/021; G01S 5/0284; H04W 64/003
See application file for complete search history.

(56) References Cited

U.S. PATENT DOCUMENTS

| | | | |
|---|---|---|---|
| 2005/0001763 A1* | 1/2005 | Han | ........................ G01S 19/44 342/357.44 |
| 2013/0113660 A1* | 5/2013 | Tufvesson | ................ G01S 5/08 342/450 |

(Continued)

FOREIGN PATENT DOCUMENTS

| | | |
|---|---|---|
| CN | 102334320 A | 1/2012 |
| CN | 102713675 A | 10/2012 |

(Continued)

OTHER PUBLICATIONS

Laurichesse D et al: "Zero-difference Ambiguity Fixing for Spaceborne GPS Receivers", GNSS 2008—Proceedings of The 21 St International Technical Meeting of the Satellite Division of the Institute of Navigation (Ion GNSS 2008), USA, Sep. 19, 2008, pp. 758-768.

(Continued)

*Primary Examiner* — Khai M Nguyen
(74) *Attorney, Agent, or Firm* — Kilpatrick Townsend & Stockton LLP

(57) ABSTRACT

A positioning method and device used for solving the problems of the existing method for determining an integer ambiguity being relatively difficult and relatively time-consuming. During positioning, the method includes a receiving device determining a virtual phase measured value according to at least two received C-PRS signals (600); determining a TOA measured value according to a received (Continued)

PRS signal (601); determining a virtual integer ambiguity according to the TOA measured value and the virtual phase measured value (602); and finally, determining the location of the receiving device according to the virtual integer ambiguity (603). An integer ambiguity search space is reduced, and the integer ambiguity is determined faster, thus improving the efficiency of determining the location of the receiving device.

20 Claims, 5 Drawing Sheets

(51) Int. Cl.
    *G01S 5/10*     (2006.01)
    *H04W 64/00*     (2009.01)

(56) References Cited

U.S. PATENT DOCUMENTS

2018/0017661 A1     1/2018   Morioka
2018/0199160 A1     7/2018   Edge

FOREIGN PATENT DOCUMENTS

| | | |
|---|---|---|
| CN | 103634899 A | 3/2014 |
| CN | 104040367 A | 9/2014 |
| CN | 105204049 A | 12/2015 |
| CN | 105264920 A | 1/2016 |
| CN | 106792508 A | 5/2017 |
| CN | 106802426 A | 6/2017 |
| CN | 107113569 A | 8/2017 |
| CN | 108054522 A | 5/2018 |
| JP | 2014513271 A | 5/2014 |
| WO | 2019004549 A1 | 1/2019 |
| WO | 2019141090 A1 | 7/2019 |

OTHER PUBLICATIONS

CATT,"Discussion of Potential Techniques for NR Positioning", 3GPP TSG RAN WG1 Meeting #94bis, Chengdu, China, Oct. 8-12, 2018, total 12 pages, R1-1810532.

CATT,"Discussion of Potential Techniques for NR Positioning", 3GPP TSG RAN WG1 Meeting #95, Spokane, USA, Nov. 12-16, 2018, total 13 pages, R1-1812615.

\* cited by examiner

POSITIONING METHOD AND DEVICE

CROSS-REFERENCE OF RELATED APPLICATIONS

The present application is a national phase entry under 35 U.S.C. § 371 of International Application No. PCT/CN2019/125755, filed on Dec. 16, 2019, which claims the priority from Chinese Patent Application No. 201910028366.2, filed on Jan. 11, 2019, in the China National Intellectual Property Administration and entitled "Positioning Method and Device", which is hereby incorporated by reference in its entirety.

FIELD

The present application relates to the field of wireless communication technology, and in particular to a positioning method and device.

BACKGROUND

In the process of wireless communication, it is often necessary to determine the location of the terminal. Currently, there are many ways to locate the terminal, one of which is a terminal positioning method of the 3GPP wireless communication system's own positioning reference signal. This method is characterized by positioning based on the Positioning Reference Signal (PRS) of the wireless communication system itself, and can work in an environment where no reference signal outside the network is received, but the problem of this positioning method is low positioning accuracy. The second method is a terminal positioning method based on satellite signals of Global Navigation Satellite System (GNSS), but this positioning method using GNSS satellite signals cannot work normally when the GNSS satellite signals are weak or cannot be received. There is also a positioning method for UE based on the measurement value of the carrier signal phase of the 3GPP wireless communication system itself.

Here, in the positioning method based on the measurement value of the carrier signal phase of the 3GPP wireless communication system itself, the signal transmitter in the 3GPP wireless communication system not only sends a PRS but also sends a Carrier phase Positioning Reference Signal (C-PRS). The receiver obtains positioning measurement values by receiving the PRS and C-PRS, including the Time of Arrival (TOA)/Time difference of Arrival (TDOA) and carrier phase measurement value. This method uses the 3GPP wireless communication system itself to send the positioning reference signal and carrier reference signal for positioning, can work when the GNSS satellite signals are weak or cannot be received, and determines the location of the terminal with high accuracy.

When using the carrier phase measurement value for positioning, it is necessary to determine the unknown number that is an integer multiple of the carrier wavelength contained in the carrier phase measurement values, which is usually called the integer ambiguity. Therefore, one of the key factors for using the carrier phase measurement values for positioning is how to quickly and reliably search for the integer ambiguity in the carrier phase measurement values in a short time. However, the current method of determining the integer ambiguity is relatively difficult and takes a long time.

SUMMARY

The embodiments of the present application provide a positioning method and device, to solve the problem that the current method of determining the integer ambiguity is relatively difficult and takes a long time.

In a first aspect, a positioning method provided by an embodiment of the present application includes:
  determining, by a receiving device, a virtual phase measurement value according to at least two received C-PRS signals;
  determining, by the receiving device, a TOA measurement value according to a PRS signal received within a same predetermined period as the at least two C-PRSs;
  determining, by the receiving device, a virtual integer ambiguity for representing an integer multiple of a carrier wavelength contained in the virtual phase measurement value according to the TOA measurement value and the virtual phase measurement value; and
  determining, by the receiving device, a location of the receiving device according to the virtual integer ambiguity.

In a possible implementation, determining, by the receiving device, a TOA measurement value according to a PRS received within a same predetermined period as the at least two C-PRSs, includes:
  when the receiving device receives a PRS from a transmitting device, determining a non-differential TOA measurement value according to the PRS through a TOA measurement algorithm operation; or
  when the receiving device receives PRSs from at least two transmitting devices, one of the at least two transmitting devices is a reference transmitting device, and one of the at least two transmitting devices other than the reference transmitting device is a non-reference transmitting device, obtaining at least two non-differential TOA measurement values according to the PRSs through a TOA measurement algorithm operation, and determining a single-differential TOA measurement value by performing a differential operation on the at least two non-differential TOA measurement values of the reference transmitting device and non-reference transmitting device; or
  when at least two transmitting devices send PRSs to multiple receiving devices and one of the at least two transmitting devices is a reference transmitting device and one of the multiple receiving devices is a reference receiving device with a known location, performing, by each of the multiple receiving devices, TOA measurement algorithm operations and single differential operations on the PRSs transmitted by the at least two transmitting devices to obtain a single-differential TOA measurement value of each of the multiple receiving devices, and then performing a differential operation on the single-differential TOA measurement value of each of the multiple receiving devices to obtain a dual-differential TOA measurement value.

In a possible implementation, determining, by the receiving device, a virtual phase measurement value according to at least two received C-PRSs, includes:
  determining, by the receiving device, an actual phase measurement value corresponding to each C-PRS of the at least two C-PRSs; and
  determining, by the receiving device, the virtual phase measurement value according to determined actual phase measurement values corresponding to the at least two C-PRSs.

In a possible implementation, determining, by the receiving device, an actual phase measurement value corresponding to each C-PRS of the at least two C-PRSs, includes:

when the receiving device receives at least one C-PRS from a transmitting device, determining a non-differential actual phase measurement value according to the at least one C-PRS through a carrier phase measurement algorithm operation; or when the receiving device receives the at least two C-PRSs from at least two transmitting devices, one of the at least two transmitting devices is a reference transmitting device, and one of the at least two transmitting devices other than the reference transmitting device is a non-reference transmitting device, obtaining at least two non-differential carrier phase measurement values according to the at least two C-PRSs through carrier phase measurement algorithm operations, and determining a single-differential actual phase measurement value by performing a differential operation on the at least two non-differential carrier phase measurement values of the reference transmitting device and non-reference transmitting device; or when at least two transmitting devices transmit the at least two C-PRSs to multiple receiving devices and one of the at least two transmitting devices is a reference transmitting device and one of the multiple receiving devices is a reference receiving device with a known location, performing, by each of the multiple receiving devices, carrier phase measurement algorithm operations and single differential operations on the at least two C-PRSs transmitted by the at least two transmitting devices to obtain a single-differential carrier phase measurement value of each of the multiple receiving devices, and then performing a differential operation on the single-differential carrier phase measurement value of each of the multiple receiving devices to obtain a dual-differential actual phase measurement value.

In a possible implementation, determining, by the receiving device, the virtual phase measurement value according to determined actual phase measurement values corresponding to the at least two C-PRSs, includes:

performing, by the receiving device, a weighting process of the actual phase measurement value corresponding to each C-PRS of the at least two C-PRSs with a wavelength-related weighting coefficient; and accumulating and combining, by the receiving device, all results of weighting processes to obtain the virtual phase measurement value.

In a possible implementation, determining, by the receiving device, a virtual integer ambiguity for representing an integer multiple of a carrier wavelength contained in the virtual phase measurement value according to the TOA measurement value and the virtual phase measurement value, includes:

determining, by the receiving device, the virtual integer ambiguity according to the TOA measurement value, the virtual phase measurement value, and a virtual wavelength obtained by weighting a wavelength of each of the at least two C-PRSs and a wavelength-related weighting coefficient.

In a possible implementation, determining, by the receiving device, a location of the receiving device according to the virtual integer ambiguity, includes:

determining, by the receiving device, a real integer ambiguity according to the virtual integer ambiguity; and determining, by the receiving device, the location of the receiving device according to the real integer ambiguity.

In a possible implementation, determining, by the receiving device, a real integer ambiguity according to the virtual integer ambiguity, includes:

using, by the receiving device, the virtual integer ambiguity as the real integer ambiguity; or determining, by the receiving device, the real integer ambiguity according to the virtual integer ambiguity, the virtual phase measurement value, a wavelength of each C-PRS of the at least two C-PRSs, and a phase measurement value corresponding to the C-PRS.

In a second aspect, a positioning method provided by an embodiment of the present application includes:

configuring, by a transmitting device, at least two C-PRSs; and transmitting, by the transmitting device, a PRS and the at least two C-PRSs to a receiving device.

In a possible implementation, a ratio of the magnitude of a virtual phase measurement error determined by wavelengths of the at least two C-PRSs configured by the transmitting device to the magnitude of a TOA measurement error pre-defined, or pre-configured by network is within a set range.

In a third aspect, an embodiment of the present application provides a positioning device, including a processor and a transceiver:

the processor is configured to: determine a virtual phase measurement value according to at least two received C-PRSs;

determine a TOA measurement value according to a PRS received within a same predetermined period as the at least two C-PRSs;

determine a virtual integer ambiguity for representing an integer multiple of a carrier wavelength contained in the virtual phase measurement value according to the TOA measurement value and the virtual phase measurement value; and determine a location of the receiving device according to the virtual integer ambiguity.

In a fourth aspect, an embodiment of the present application provides a positioning device, including a processor and a transceiver:

the processor is configured to: configure at least two C-PRSs; and transmit a PRS and the at least two C-PRSs to a receiving device.

In a fifth aspect, an embodiment of the present application further provides a positioning device, which includes:

at least one processing unit and at least one storage unit, where the storage unit stores program codes, and the program codes, when executed by the processing unit, cause the processing unit to execute the function of each embodiment of any aspect in the first aspect described above.

In a sixth aspect, an embodiment of the present application further provides a positioning device, which includes:

at least one processing unit and at least one storage unit, where the storage unit stores program codes, and the program codes, when executed by the processing unit, cause the processing unit to execute the function of each embodiment of any aspect in the second aspect described above.

In a seventh aspect, the present application further provides a computer storage medium storing a computer program thereon, where the program implements the steps of the method of any aspect in the first aspect when executed by a processor.

In an eighth aspect, the present application further provides a computer storage medium storing a computer program thereon, where the program implements the steps of the method of any aspect in the second aspect when executed by a processor.

Furthermore, the embodiments brought about by any implementation in the third to eighth aspects can refer to the embodiments brought about by different implementations in the first and second aspects, and will not be repeated here.

BRIEF DESCRIPTION OF THE DRAWINGS

In order to illustrate the embodiments of the present application more clearly, the accompanying figures used in describing the embodiments will be introduced below briefly.

DETAILED DESCRIPTION OF THE EMBODIMENTS

Figure 1:
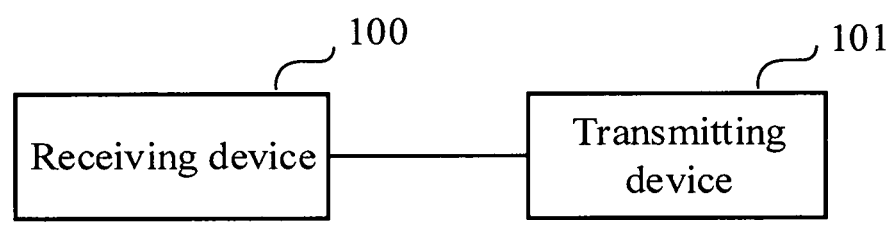
FIG. 1 is a structural schematic diagram of a positioning system according to an embodiment of the present application.

In order to make the embodiments of the present application clearer, the embodiments of the present application will be further illustrated below in details with reference to the accompanying figures. The described embodiments are merely a part of the embodiments of the present application but not all the embodiments.

Some words that appear herein will be explained below.
(1) The term "a plurality of" in the embodiments of the present application refers to two or more, and other quantifiers are similar thereto.
(2) The term "and/or" describes the association relationship of the associated objects, and indicates that there may be three relationships, for example, A and/or B may represent: only A, both A and B, and only B. The character "/" indicates that the associated objects have a kind of "or" relationship.
(3) The term "non-differential mode" in the embodiments of the present application refers to directly using the TOA and phase measurement values to calculate the UE location without using differential technology.
(4) The term "differential mode" in the embodiments of the present application refers to firstly performing the differential operation on the TOA and phase measurement values to eliminate some common deviations in the measurement values, and then using the differential TOA and phase measurement values to calculate the UE location. The differential modes include single differential mode and dual differential mode.
(5) The term "single differential mode" in the embodiments of the present application refers to selecting a transmitting end (or receiving end) as the reference end, and then performing the differential operation on the measurement values related to other transmitting ends (or receiving ends) and the measurement values related to the reference end.
(6) The term "dual differential mode" in the embodiments of the present application refers to performing the differential operation on the measurement values after the single differential mode to simultaneously eliminate the measurement errors related to the transmitting end and the receiving end, such as the clock offset of the base station (BS) and UE.
(7) The term "virtual integer ambiguity" in the embodiments of the present application refers to an integer multiple of the carrier wavelength contained in the virtual phase measurement value.

In the present application, a PRS and at least two C-PRSs on different frequencies are sent by the transmitting end, so that the receiving end determines at least two phase measurement values and uses the at least two phase measurement values to construct a virtual phase measurement value to quickly search for the virtual integer ambiguity of the virtual phase value, and then uses the virtual integer ambiguity and the virtual phase measurement value to calculate the location of UE.

It should be noted that the C-PRS may be a pure sinusoidal carrier and the occupied bandwidth is very narrow, so it will not occupy too much radio resources to send at least two C-PRSs on different frequencies.

As shown in FIG. 1, an embodiment of the present application provides a positioning system, which includes:
a receiving device 100 configured to: determine a virtual phase measurement value according to at least two C-PRSs received via a transceiver from a transmitting device; determine a TOA measurement value according to a PRS received from the transmitting device within a same predetermined period as the C-PRSs; determine a virtual integer ambiguity for representing an integer multiple of a carrier wavelength contained in the virtual phase measurement value according to the TOA measurement value and the virtual phase measurement value; and determine the location of the receiving device according to the virtual integer ambiguity.
a transmitting device 101 configured to: configure at least two C-PRSs; and send a PRS and the at least two C-PRSs to a receiving device via a transceiver.

In the above method, the receiving device determines the virtual phase measurement value through at least two C-PRSs received from the transmitting device, then determines the virtual integer ambiguity according to the TOA measurement value and the virtual phase measurement value, and finally determines the location of the receiving device according to the virtual integer ambiguity, reducing the search space for the integer ambiguity, determining the integer ambiguity more quickly, and to improve the efficiency in determining the location of the receiving device.

In the embodiment of the present application, the transmitting device firstly needs to configure at least two C-PRSs, and thus sends the PRS and the at least two C-PRSs to the receiving device through a transceiver. When configuring at least two C-PRSs, the transmitting device needs to consider various factors, such as the absolute positions of C-PRS transmission frequencies $f_1$ and $f_2$ and the relative location of the C-PRS transmission frequencies $f_1$ and $f_2$, because the low frequency is generally used to transmit the C-PRS when the carrier phase measurement is used for positioning. Thus, the relative carrier wavelength is longer. Under the TOA measurement error with the same magnitude, the search space for searching the integer ambiguity is small. At the same time, the virtual carrier wavelength $\lambda_v$ and the virtual measurement error $w_v$ should be considered when the relative location of the C-PRS transmission frequencies $f_1$ and $f_2$ is selected. From the perspective of $\lambda_v$, $f_1$ and $f_2$ should be configured to be closer to produce a longer $\lambda_v$ and reduce the search space. From the perspective of $w_v$, $f_1$ and $f_2$ cannot be configured to be too close to avoid the too large $w_v$ and reduce the reliability of the search. Thus, an embodiment of the present application proposes that a ratio of the magnitude of a virtual phase measurement error determined by wavelengths of the at least two C-PRSs configured by the transmitting device to the magnitude of a TOA measurement error pre-defined, or pre-configured by network is within a set range.

The receiving device receives the at least two C-PRSs on different frequencies from the transmitting device, determines at least two phase measurement values according to the at least two C-PRSs on different frequencies, and constructs a virtual phase measurement value by using the at least two phase measurement values. Here, the virtual phase value is mainly determined by the receiving device according to the determined actual phase measurement values corresponding to the C-PRSs.

Specifically, the receiving device performs the weighting processing on the actual phase measurement value corresponding to each C-PRS and a wavelength-related weighting coefficient; and the receiving device accumulates and combines all results of the weighting processes to obtain the virtual phase measurement value.

After determining the virtual phase measurement value, the receiving device quickly searches for the virtual integer ambiguity of the virtual phase value, and then calculates the location of UE by using the virtual integer ambiguity and the virtual phase measurement value. Here, the virtual integer ambiguity is mainly determined by the receiving device according to the TOA measurement value, the virtual phase measurement value, and a virtual wavelength obtained by weighting a wavelength of a C-PRS and a wavelength-related weighting coefficient.

It should be noted that the wavelength-related weighting coefficient can be determined according to actual conditions, and any coefficient suitable for the present application can be used as the wavelength-related weighting coefficients of the present application, and falls into the protection scope of the present application.

Here, there may be many ways when the receiving device calculates the location of UE according to the virtual integer ambiguity and virtual phase measurement value, which will be introduced respectively below.

A first determining way. The location of the UE is directly calculated through the virtual integer ambiguity and virtual phase measurement value.

A second determining way. The receiving device determines the real integer ambiguity according to the virtual integer ambiguity, the virtual phase measurement value, the wavelength of a received C-PRS and the phase measurement value corresponding to the C-PRS, and calculates the location of the UE according to the real integer ambiguity and the actual phase measurement value.

At present, the TOA and phase measurement values can be used for positioning in the non-differential, single-differential or dual-differential mode in the prior art. The non-differential, single-differential and dual-differential modes are also applicable to the present application. In the following, different modes will be introduced respectively, and it is assumed that each transmitting device sends two C-PRSs on different frequencies in each mode.

Here, in the following formulas, "T" represents the TOA measurement value in meters, "r" represents the geometric distance between the transmitter and the receiver, "c" represents is the speed of light, "$b_r$" and "$b_t$" represent the clock offsets of the receiver and transmitter respectively, "P" represents the phase measurement value in the unit of carrier period, "$\lambda$" represents the carrier wavelength of a C-PRS, "N" is the unknown integer ambiguity, "$w_T$" represents the TOA measurement error, and "$w_P$" is the phase measurement error.

Mode 1: Non-differential mode.

In an embodiment of the present application, the receiving device determines the TOA measurement value according to the PRS received from the transmitting device within the same predetermined period as the C-PRS signal. In the non-differential mode, specifically, if the receiving device receives a PRS from a transmitting device, a non-differential TOA measurement value is determined according to the PRS through the TOA measurement algorithm operation.

The receiving device determines the actual phase measurement value corresponding to each C-PRS, in a non-differential mode, specifically, if the receiving device receives a C-PRS from a transmitting device, a non-differential actual phase measurement value is determined according to the C-PRS through the carrier phase measurement algorithm operation.

It is assumed that "a" represents the receiving device, "i" represents the transmitting device, and "$f_1$" and "$f_2$" respectively represent the frequencies of two C-PRSs sent by the transmitting device i.

Step 1: obtaining the TOA measurement value and phase measurement value.

The receiving device a determines the TOA measurement value T by measuring the PRS sent by the transmitting device i, and determines the phase measurement values $P_1$ and $P_2$ of the frequencies $f_1$ and $f_2$ by measuring two C-PRSs sent by the transmitting device i:

$$T = r + c(b_r - b_t) + w_T \quad (1);$$

$$\lambda_1 P_1 = r + c(b_r - b_t) + \lambda_1 N_1 + w_{P1} \quad (2);$$

$$\lambda_2 P_2 = r + c(b_r - b_t) + \lambda_2 N_2 + w_{P2} \quad (3).$$

It should be noted that, for the sake of simplicity and clarity, the up and down marking symbols representing the sender and receiver are omitted in the case of no confusion.

Step 2: constructing a virtual phase measurement with a longer virtual wavelength.

Assuming that the wavelength-related weighting coefficients are $\lambda_2/(\lambda_2-\lambda_1)$ and $-\lambda_1/(\lambda_2-\lambda_1)$, both sides of equations (2) and (3) are multiplied by $\lambda_2/(\lambda_2-\lambda_1)$ and $-\lambda_1/(\lambda_2-\lambda_1)$ respectively, and then they are added together, to get the following virtual phase measurement $P_v$:

$$\lambda_v P_v = r + c(b_r - b_t) + \lambda_v N_v + w_v \quad (4).$$

Here, "$\lambda_v$", "$N_v$" and "$w_v$" represent the virtual wavelength, the virtual integer ambiguity and the virtual phase measurement error, respectively.

Step 3: searching the virtual integer ambiguity $N_v$ quickly.

From equations (1) and (4), the following relational expression for searching the virtual integer ambiguity $N_v$ can be obtained:

$$N_v=(\lambda_v P_v-T)/\lambda_v+(w_T-w_v)/\lambda_v \qquad (5).$$

Step 4a: using the virtual phase measurement value for positioning; or Step 4b: using the real phase measurement value for positioning.

In an embodiment of the present application, after $N_v$ is determined, $N_v$ can be used to search for the real integer ambiguity $N_1$ or $N_2$ for more accurate positioning. $N_1$ can be searched by using formulas (2) and (4); and $N_2$ can be searched by using formulas (3) and (4).

Assuming that the real integer ambiguity $N_1$ is searched for more precise positioning, the following relational expression for searching $N_1$ can be obtained from equations (2) and (4):

$$N_1=(\lambda_1 P_1-\lambda_v P_v+\lambda_v N_v)/\lambda_1+(w_v-w_1)/\lambda_1 \qquad (6).$$

Finally, the location of the receiving device is determined by $N_1$ and the actual phase measurement value.

Mode 2: Single-differential mode.

In an embodiment of the present application, the receiving device determines the TOA measurement value according to the PRS received from the transmitting device within the same predetermined period as the C-PRS, in the single-differential mode, specifically, if the receiving device receives PRSs from at least two transmitting devices and one of the transmitting devices is a reference transmitting device, at least two non-differential TOA measurement values are obtained according to the PRSs through the TOA measurement algorithm operation, and a single-differential TOA measurement value is determined by performing the differential operation on the TOA measurement values of the reference transmitting device and non-reference transmitting device.

The receiving device determines the actual phase measurement value corresponding to each C-PRS, in the single-differential mode, specifically, if the receiving device receives C-PRSs from at least two transmitting devices and one of the transmitting devices is a reference transmitting device, at least two non-differential carrier phase measurement values are obtained according to the C-PRSs through the carrier phase measurement algorithm operation, and a single-differential actual phase measurement value is determined by performing the differential operation on the carrier phase measurement values of the reference transmitting device and non-reference transmitting device.

It is assumed that there are two transmitting devices, namely transmitting devices i and j.

Step 1: obtaining a single-differential TOA measurement value (TDOA) and a single-differential phase measurement value.

It is assumed that the TOA measurement value (also known as TDOA) and phase measurement value after single-differential operation are:

$$T^{ij}=r^{ij}+cb_t^{ij}+w_T^{ij} \qquad (7);$$

$$\lambda_1 P_1^{ij}=r^{ij}+cb_t^{ij}+\lambda_1 N_1^{ij}+w_1^{ij} \qquad (8);$$

$$\lambda_2 P_2^{ij}=r^{ij}+cb_t^{ij}+\lambda_2 N_2^{ij}+w_2^{ij} \qquad (9).$$

Here, the superscript "ij" means that the single-differential operation is performed between the measurement values of two transmitting ends i and j, namely:

$$x^{ij}=x^i-x^j (x=T,r,b_t,w_T;P_1,N_1,w_1;P_2,N_2,w_2) \qquad (10).$$

Here, "x" represents the general formula of the variables in the above formulas (7) to (9).

If it is assumed that the BS is the transmitting device and the UE is the receiving device, the clock deviation of the receiving end UE is eliminated in the single-differential mode.

Step 2: constructing a virtual single-differential phase measurement with a longer virtual wavelength.

Assuming that the wavelength-related weighting coefficients are $\lambda_2/(\lambda_2-\lambda_1)$ and $-\lambda_1/(\lambda_2-\lambda_1)$, both sides of equations (8) and (9) are multiplied by $\lambda_2/(\lambda_2-\lambda_1)$ and $-\lambda_1/(\lambda_2-\lambda_1)$ respectively, and then they are added together, to get the following virtual single-differential phase measurement value $P_v^{ij}$:

$$\lambda_v P_v^{ij}=r^{ij}+cb_t^{ij}+\lambda_v N_v^{ij}+w_v^{ij} \qquad (11).$$

Here, "$\lambda_v$", "$N_v^{ij}$" and "$w_v^{ij}$" represent the virtual carrier wavelength, the virtual integer ambiguity related to the single-differential carrier phase measurement, and virtual measurement error related to the single-differential carrier phase measurement, respectively.

Step 3: searching the virtual integer ambiguity $N_v$ quickly.

From equations (7) and (11), the following relational expression for searching the virtual integer ambiguity $N_v^{ij}$ can be obtained:

$$N_v^{ij}=(\lambda_v P_v^{ij}-T^{ij})/\lambda_v+(w_T^{ij}-w_v^{ij})/\lambda_v \qquad (12).$$

Step 4a: using the virtual phase measurement value for positioning; or Step 4b: using the real phase measurement value for positioning.

In an embodiment of the present application, after $N_v^{ij}$ is obtained, $N_v^{ij}$ can be used to further search for $N_1^{ij}$ or $N_2^{ij}$, and then $P_1^{ij}$ and/or $P_2^{ij}$ are used for more precise positioning, where $N_1^{ij}$ can be searched by using formulas (8) and (11); and $N_2$ can be searched by using formulas (9) and (11).

Assuming that the real integer ambiguity $N_1^{ij}$ is searched for more precise positioning, the following relational expression for searching $N_1^{ij}$ can be obtained from equations (8) and (11):

$$N_1^{ij}=(\lambda_1 P_1^{ij}-\lambda_v P_v^{ij}+\lambda_v N_v^{ij})/\lambda_1+(w_v^{ij}-w_1^{ij})/\lambda_1 \qquad (13).$$

Finally, $N_1^{ij}$ and $P_1^{ij}$; or $N_1^{ij}$ and $P_2^{ij}$; or $N_1^{ij}$ and $P_1^{ij}$ and $P_2^{ij}$ are used for more precise positioning.

Mode 3: dual-differential mode.

In an embodiment of the present application, the receiving device determines the TOA measurement value according to the PRS received from the transmitting device within the same predetermined period as the C-PRS, in the dual-differential mode, specifically, if the at least two transmitting devices send PRSs to multiple receiving devices and one of the transmitting devices is a reference transmitting device and one of the receiving devices is a reference receiving device with a known location, the receiving device performs TOA measurement algorithm operations and single differential operations on the PRSs sent by all transmitting devices to obtain a single-differential TOA measurement value of each of the multiple receiving devices, and then performs the differential operations on the single-differential TOA measurement values of the multiple receiving devices to obtain a dual-differential TOA measurement value.

The receiving device determines the actual phase measurement value corresponding to each C-PRS, in the dual-differential mode, specifically, if the at least two transmitting devices send C-PRSs to multiple receiving devices and one of the transmitting devices is a reference transmitting device and one of the receiving devices is a reference receiving device with a known location, the receiving device performs carrier phase measurement algorithm operations and single differential operations on the C-PRS signals sent by all transmitting devices to obtain a single-differential actual phase measurement value of each of the multiple receiving devices, and then performs the differential operations on the single-differential actual phase measurement values of the multiple receiving devices to obtain a dual-differential actual phase measurement value.

It is assumed that there are two receiving devices, namely receiving devices a and b, and two transmitting devices, namely transmitting devices i and j.

Step 1: obtaining a dual-differential TOA measurement value (TDOA) and a dual-differential phase measurement value.

It is assumed that the receiving devices a and b measure the TOA and carrier phase measurement values from reference signal transmitted from the transmitting devices i and j, respectively, and perform the dual differential operations on the obtained TOA and carrier phase measurement values. The measurement values after the dual differential operation are:

$$T_{ab}^{ij} = r_{ab}^{ij} + w_{ab,T}^{ij} \quad (14);$$

$$\lambda_1 P_{ab,1}^{ij} = r_{ab}^{ij} + \lambda_1 N_{ab,1}^{ij} + w_{ab,1}^{ij} \quad (15);$$

$$\lambda_2 P_{ab,2}^{ij} = r_{ab}^{ij} + \lambda_2 N_{ab,2}^{ij} + w_{ab,2}^{ij} \quad (16).$$

Here, the double superscript "ij" represents the difference between the transmitting ends i and j, and the double subscript "ab" represents the difference between the receiving ends a and b. From equations (14), (15) and (16), it can be seen that the clock offset errors of the transmitter and receiver have been eliminated after the dual differential operation.

Step 2: constructing a virtual dual-differential phase measurement with a longer virtual wavelength.

Assuming that the wavelength-related weighting coefficients are $\lambda_2/(\lambda_2-\lambda_1)$ and $-\lambda_1/(\lambda_2-\lambda_1)$, both sides of equations (15) and (16) are multiplied by $\lambda_2/(\lambda_2-\lambda_1)$ and $-\lambda_1/(\lambda_2-\lambda_1)$ respectively, and then they are added together, to get the following virtual dual-differential phase measurement value $\lambda_v P_{ab,v}^{ij}$:

$$\lambda_v P_{ab,v}^{ij} = r_{ab}^{ij} + \lambda_v N_{ab,v}^{ij} + w_{ab,v}^{ij} \quad (17).$$

Here, "$\lambda_v$", "$N_{ab,v}^{ij}$" and "$w_{ab,v}^{ij}$" represent the virtual carrier wavelength, the virtual integer ambiguity related to the dual-differential carrier phase measurement, and virtual measurement error related to the dual-differential carrier phase measurement, respectively.

Step 3: searching the virtual integer ambiguity $N_v$ quickly.

From equations (14) and (17), the following relational expression for searching the virtual integer ambiguity $N_{ab,v}^{ij}$ can be obtained:

$$N_{ab,v}^{ij} = (\lambda_v P_{ab,v}^{ij} - T_{ab}^{ij})/\lambda_v + (w_{T,ab}^{ij} - w_{ab,v}^{ij})/\lambda_v \quad (18).$$

Step 4a: using the virtual phase measurement value for positioning.

After $N_{ab,v}^{ij}$ is obtained, the virtual phase measurement value $P_{ab,v}^{ij}$ can be directly used for positioning. At this time, the positioning accuracy depends on the virtual phase measurement error $w_{ab,v}^{ij}$.

In one embodiment, instead of step 4a, perform Step 4b: using the real phase measurement value for positioning.

In an embodiment of the present application, after $N_{ab,v}^{ij}$ is obtained, $N_{ab,v}^{ij}$ can be used to further search for $N_{ab,1}^{ij}$ or $N_{ab,2}^{ij}$, and then $P_{ab,1}^{ij}$ and/or $P_{ab,2}^{ij}$ are used for more precise positioning. $N_{ab,1}^{ij}$ can be searched by using formulas (15) and (18); and $N_{ab,2}^{ij}$ can be searched by using formulas (16) and (18).

Assuming that the real integer ambiguity $N_{ab,1}^{ij}$ is searched for more precise positioning, the following relational expression for searching $N_{ab,1}^{ij}$ can be obtained from equations (15) and (18):

$$N_{ab,1}^{ij} = (\lambda_1 P_{ab,1}^{ij} - \lambda_v P_{ab,v}^{ij} + \lambda_v N_{ab,v}^{ij})/\lambda_1 + (w_{ab,v}^{ij} - w_{ab,v}^{ij})/\lambda_1 \quad (19).$$

Finally, $N_{ab,1}^{ij}$ and $P_{ab,1}^{ij}$; or $N_{ab,1}^{ij}$ and $P_{ab,2}^{ij}$; or $N_{ab,1}^{ij}$ and $P_{ab,1}^{ij}$ and $P_{ab,2}^{ij}$ are used for more precise positioning.

It should be noted that the PRS in the present application represents all reference signals that can be used to measure the TOA. For example, it includes a PRS that can be used for traditional OTDOA (Observed Time Difference Of Arrival)/UTDOA (Uplink observed Time Difference Of Arrival) positioning, a CSI-RS (Channel State Indication Reference Signal), a SRS (Sounding Reference Signal), etc.

In some possible embodiments, various aspects of the positioning method provided in the embodiments of the present application can also be implemented in the form of a program product, which includes program codes. When the program product runs on a computer device, the program codes are configured to cause the computer device to perform the steps in the positioning method according to various exemplary embodiments of the present application described in this specification.

The program product can use any combination of one or more readable media. The readable medium may be a readable signal medium or a readable storage medium. The readable storage medium may be, for example but not limited to, electrical, magnetic, optical, electromagnetic, infrared, or semiconductor system, apparatus or device, or any combination thereof. More specific examples of the readable storage media (non-exhaustive list) include: electrical connection with one or more wires, portable disk, hard disk, Random Access Memory (RAM), Read Only Memory (ROM), Erasable Programmable Read Only Memory (EPROM) or flash memory, optical fiber, portable Compact Disk-Read Only Memory (CD-ROM), optical storage device, magnetic storage device, or any suitable combination thereof.

The program product for the data forwarding control according to the embodiment of the present application may adopt a portable Compact Disk-Read Only Memory (CD-ROM) and include program codes, and may be run on a server device. However, the program product of the present application is not limited to this. In this document, the readable storage medium can be any tangible medium that contains or stores a program, where the program can be used by or used in combination with the information transmission apparatus or device.

The readable signal medium may include data signals propagated in the baseband or as a part of carrier waves, and the readable program codes are included therein. Such propagated data signals can be in many forms, including but not limited to electromagnetic signals, optical signals, or any suitable combination thereof. The readable signal medium may also be any readable medium other than the readable storage medium, and the readable medium may send, propagate or transmit the programs used by or used in combination with the periodic network action system, apparatus or device.

The program codes contained on the readable medium can be transmitted by any suitable medium, including but not limited to wireless, wired, optical cable, RF, etc., or any suitable combination thereof.

The program codes for performing the operations of the present application can be compiled in any combination of one or more programming languages, where the programming languages include the object-oriented programming languages such as Java, C++, etc., and also include the conventional procedural programming languages such as "C" language or similar programming languages. The program codes can be executed entirely on a user computing device, executed partly on a user computing device, executed as an independent software package, executed partly on a user computing device and partly on a remote computing device, or executed entirely on a remote computing device or server. In the case of a remote computing device, the remote computing device can be connected to the user computing device through any kind of network including Local Area Network (LAN) or Wide Area Network (WAN), or can be connected to an external computing device.

Figure 2:
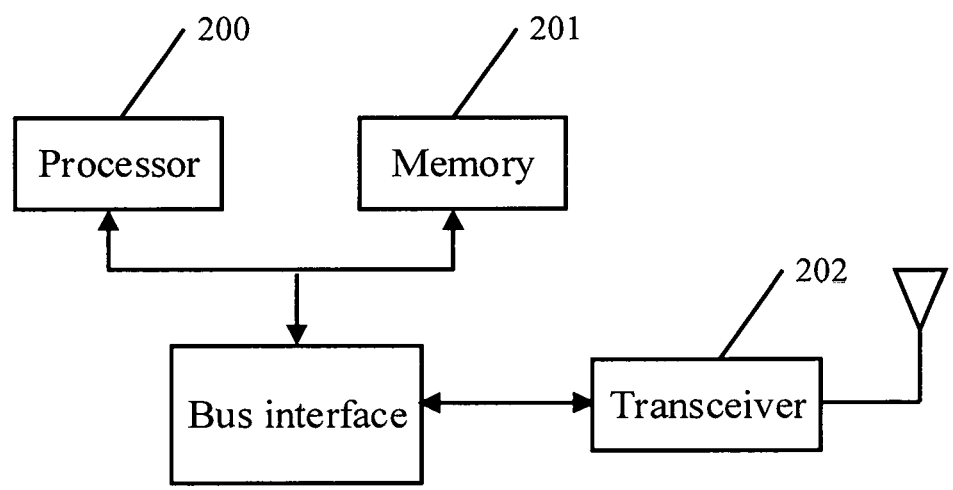
FIG. 2 is a structural schematic diagram of a first positioning device according to an embodiment of the present application.

As shown in FIG. 2, an embodiment of the present application provides a positioning device, which includes a processor 200, a memory 201, and a transceiver 202.

The processor 200 is responsible for managing the bus architecture and general processing, and the memory 201 may store the data used by the processor 200 when performing the operations. The transceiver 202 is configured to receive and send the data under the control of the processor 200.

The bus architecture may include any numbers of interconnected buses and bridges, and specifically link various circuits of one or more processors represented by the processor 200 and the memory represented by the memory 201. The bus architecture may further link various other circuits such as peripheral device, voltage regulator and power management circuit, which are all well known in the art and thus will not be further described again herein. The bus interface provides an interface. The processor 200 is responsible for managing the bus architecture and general processing, and the memory 201 may store the data used by the processor 200 when performing the operations.

The procedure described in the embodiment of the present application may be applied in the processor 200 or implemented by the processor 200. In the implementation process, each step of the signal processing flow may be completed by the integrated logic circuit of hardware in the processor 200 or the instruction in the form of software. The processor 200 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 201, and the processor 200 reads the information in the memory 201 and completes the steps of the signal processing flow in combination with its hardware.

Specifically, the processor 200 is configured to read the program in the memory 201 and perform:
determining a virtual phase measurement value according to at least two received C-PRSs; determining a TOA measurement value according to a PRS received within a same predetermined period as the at least two C-PRSs; determining a virtual integer ambiguity for representing an integer multiple of a carrier wavelength contained in the virtual phase measurement value according to the TOA measurement value and the virtual phase measurement value; and determining the location of the receiving device according to the virtual integer ambiguity.

In one embodiment, the processor 200 is specifically configured to:
when a PRS is received from a transmitting device, determine a non-differential TOA measurement value according to the PRS through a TOA measurement algorithm operation; or
when PRSs are received from at least two transmitting devices, one of the at least two transmitting devices is a reference transmitting device, and one of the at least two transmitting devices other than the reference transmitting device is a non-reference transmitting device, obtain at least two non-differential TOA measurement values according to the PRSs through a TOA measurement algorithm operation, and determine a single-differential TOA measurement value by performing a differential operation on the at least two non-differential TOA measurement values of the reference transmitting device and non-reference transmitting device; or
when PRSs are received by multiple receiving devices from at least two transmitting devices and one of the at least two transmitting devices is a reference transmitting device and one of the multiple receiving devices is a reference receiving device with a known location, perform TOA measurement algorithm operations and single differential operations on the PRSs transmitted by the at least two transmitting devices to obtain a single-differential TOA measurement value of each of the multiple receiving devices, and then perform a differential operation on the single-differential TOA measurement value of each of the multiple receiving devices to obtain a dual-differential TOA measurement value.

In one embodiment, the processor 200 is specifically configured to:
determine an actual phase measurement value corresponding to each C-PRS of the at least two C-PRSs; and determine the virtual phase measurement value according to determined actual phase measurement values corresponding to the at least two C-PRSs.

In one embodiment, the processor 200 is specifically configured to:
when at least one C-PRS is received from a transmitting device, determine a non-differential actual phase measurement value according to the at least one C-PRS through a carrier phase measurement algorithm operation; or
when the at least two C-PRSs are received from at least two transmitting devices, one of the at least two transmitting devices is a reference transmitting device, and one of the at least two transmitting devices other than the reference transmitting device is a non-reference transmitting device, obtain at least two non-differential carrier phase measurement values according to the at least two C-PRSs through carrier phase measurement algorithm operations, and determine a single-differential actual phase measurement value by performing a differential operation on the at least two non-differential carrier phase measurement values of the reference transmitting device and the non-reference transmitting device; or when the at least two C-PRSs are received by multiple receiving devices from at least two transmitting devices and one of the at least two transmitting devices is a reference transmitting device and one of the multiple receiving devices is a reference receiving device with a known location, perform carrier phase measurement algorithm operations and single differential operations on the at least two C-PRSs transmitted by the at least two transmitting devices to obtain a single-differential carrier phase measurement value of each of the multiple receiving devices, and then perform a differential operation on the single-differential carrier phase measurement value of each of the multiple receiving devices to obtain a dual-differential actual phase measurement value.

In one embodiment, the processor 200 is specifically configured to:

perform a weighting process of the actual phase measurement value corresponding to each C-PRS of the at least two C-PRSs with a wavelength-related weighting coefficient; and accumulate and combine all results of weighting processes to obtain the virtual phase measurement value.

In one embodiment, the processor 200 is specifically configured to:

determine the virtual integer ambiguity according to the TOA measurement value, the virtual phase measurement value, and a virtual wavelength obtained by weighting a wavelength of each of the at least two C-PRSs and a wavelength-related weighting coefficient.

In one embodiment, the processor 200 is specifically configured to:

determine a real integer ambiguity according to the virtual integer ambiguity; and determine the location of the receiving device according to the real integer ambiguity.

In one embodiment, the processor 200 is specifically configured to:

use the virtual integer ambiguity as the real integer ambiguity; or determine the real integer ambiguity according to the virtual integer ambiguity, the virtual phase measurement value, a wavelength of each C-PRS of the at least two C-PRS, and a phase measurement value corresponding to the C-PRS.

Figure 3:
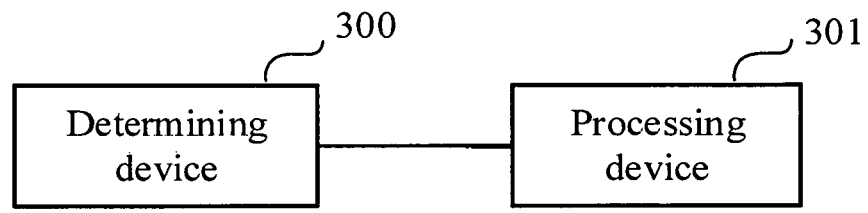
FIG. 3 is a structural schematic diagram of a second positioning device according to an embodiment of the present application.

As shown in FIG. 3, the present application provides a positioning device, which includes:

a determining device 300 configured to determine a virtual phase measurement value according to at least two received C-PRSs; determine a TOA measurement value according to a PRS received within a same predetermined period as the at least two C-PRSs; and determine a virtual integer ambiguity for representing an integer multiple of a carrier wavelength contained in the virtual phase measurement value according to the TOA measurement value and the virtual phase measurement value;

a processing device 301 configured to determine the location of the receiving device according to the virtual integer ambiguity.

In one embodiment, the determining device 300 is specifically configured to:

when a PRS is received from a transmitting device, determine a non-differential TOA measurement value according to the PRS through a TOA measurement algorithm operation; or when PRSs are received from at least two transmitting devices, one of the at least two transmitting devices is a reference transmitting device, and one of the at least two transmitting devices other than the reference transmitting device is a non-reference transmitting device, obtain at least two non-differential TOA measurement values according to the PRSs through a TOA measurement algorithm operation, and determine a single-differential TOA measurement value by performing a differential operation on the at least two non-differential TOA measurement values of the reference transmitting device and the non-reference transmitting device; or when PRSs are received by multiple receiving devices from at least two transmitting devices and one of the at least two transmitting devices is a reference transmitting device and one of the multiple receiving devices is a reference receiving device with a known location, perform TOA measurement algorithm operations and single differential operations on the PRSs transmitted by the at least two transmitting devices to obtain a single-differential TOA measurement value of each of the multiple receiving devices, and then perform a differential operation on the single-differential TOA measurement value of each of the multiple receiving devices to obtain a dual-differential TOA measurement value.

In one embodiment, the determining device 300 is specifically configured to:

determine an actual phase measurement value corresponding to each C-PRS of the at least two C-PRSs; and determine the virtual phase measurement value according to determined actual phase measurement values corresponding to the at least two C-PRSs.

In one embodiment, the determining device 300 is specifically configured to:

when at least one C-PRS is received from a transmitting device, determine a non-differential actual phase measurement value according to the at least one C-PRS through a carrier phase measurement algorithm operation; or when the at least two C-PRSs are received from at least two transmitting devices, one of the at least two transmitting devices is a reference transmitting device, and one of the at least two transmitting devices other than the reference transmitting device is a non-reference transmitting device, obtain at least two non-differential carrier phase measurement values according to the at least two C-PRSs through carrier phase measurement algorithm operations, and determine a single-differential actual phase measurement value by performing a differential operation on the at least two non-differential carrier phase measurement values of the reference transmitting device and the non-reference transmitting device; or when the at least two C-PRSs are received by multiple receiving devices from at least two transmitting devices and one of the at least two transmitting devices is a reference transmitting device and one of the multiple receiving devices is a reference receiving device with a known location, perform carrier phase measurement algorithm operations and single differential operations on the at least two C-PRSs transmitted by the at least two transmitting devices to obtain a single-differential carrier phase measurement value of each of the multiple receiving devices, and then perform a differential operation on the single-differential carrier phase measurement value of each of the multiple receiving devices to obtain a dual-differential actual phase measurement value.

In one embodiment, the determining device 300 is specifically configured to:
perform a weighting process of the actual phase measurement value corresponding to each C-PRS of the at least two C-PRSs with a wavelength-related weighting coefficient; and accumulate and combine all results of the weighting processes to obtain the virtual phase measurement value.

In one embodiment, the determining device 300 is specifically configured to:
determine the virtual integer ambiguity according to the TOA measurement value, the virtual phase measurement value, and a virtual wavelength obtained by weighting a wavelength of each of the at least two C-PRSs and a wavelength-related weighting coefficient.

In one embodiment, the processing device 301 is specifically configured to:
determine a real integer ambiguity according to the virtual integer ambiguity; and determine the location of the receiving device according to the real integer ambiguity.

In one embodiment, the determining device 300 is specifically configured to:
use the virtual integer ambiguity as the real integer ambiguity; or
determine the real integer ambiguity according to the virtual integer ambiguity, the virtual phase measurement value, a wavelength of each C-PRS of the at least two C-PRS, and a phase measurement value corresponding to the C-PRS.

Figure 4:
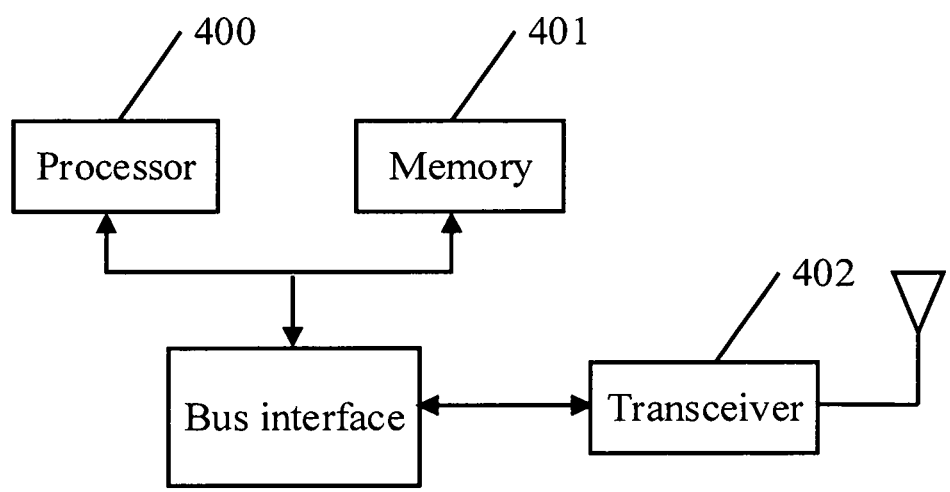
FIG. 4 is a structural schematic diagram of a third positioning device according to an embodiment of the present application.

As shown in FIG. 4, an embodiment of the present application provides a positioning device, which includes a processor 400, a memory 401 and a transceiver 402.

The processor 400 is responsible for managing the bus architecture and general processing, and the memory 401 may store the data used by the processor 400 when performing the operations. The transceiver 402 is configured to receive and send the data under the control of the processor 400.

The bus architecture may include any numbers of interconnected buses and bridges, and specifically link various circuits of one or more processors represented by the processor 400 and the memory represented by the memory 401. The bus architecture may further link various other circuits such as peripheral device, voltage regulator and power management circuit, which are all well known in the art and thus will not be further described again herein. The bus interface provides an interface. The processor 400 is responsible for managing the bus architecture and general processing, and the memory 401 may store the data used by the processor 400 when performing the operations.

The procedure disclosed by the embodiment of the present application may be applied in the processor 400 or implemented by the processor 400. In the implementation process, each step of the signal processing flow may be completed by the integrated logic circuit of hardware in the processor 400 or the instruction in the form of software. The processor 400 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 401, and the processor 400 reads the information in the memory 401 and completes the steps of the signal processing flow in combination with its hardware.

Specifically, the processor 400 is configured to read the program in the memory 401 and perform:
configuring at least two C-PRSs; and transmitting a PRS and the at least two C-PRSs to a receiving device via the transceiver.

In one embodiment, a ratio of the magnitude of a virtual phase measurement error determined by wavelengths of the at least two C-PRSs configured by the transmitting device to the magnitude of a TOA measurement error pre-defined, or pre-configured by network is within a set range.

Figure 5:
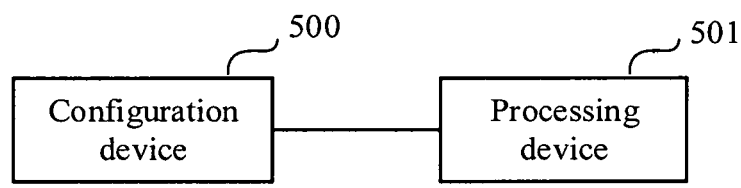
FIG. 5 is a structural schematic diagram of a fourth positioning device according to an embodiment of the present application.

As shown in FIG. 5, the present application provides a positioning device, which includes:
a configuration device 500 configured to configure at least two C-PRSs;
a processing device 501 configured to transmit a PRS and the at least two C-PRSs configured to a receiving device.

In one embodiment, a ratio of the magnitude of a virtual phase measurement error determined by wavelengths of the at least two C-PRSs configured by the transmitting device to the magnitude of a TOA measurement error pre-defined, or pre-configured by network is within a set range.

An embodiment of the present application further provides a non-volatile readable storage medium including program codes. When the program codes run on a computing device, the program codes are configured to cause the computing device to perform the steps of the positioning method.

Based on the same inventive concept, an embodiment of the present application further provides a positioning method. Since the device corresponding to this method is the positioning device of the embodiments of the present application and the principle solving the problem of this method is similar to that of this device, the implementations of this method can refer to the implementations of the device, and the repeated description thereof will be omitted here.

Figure 6:
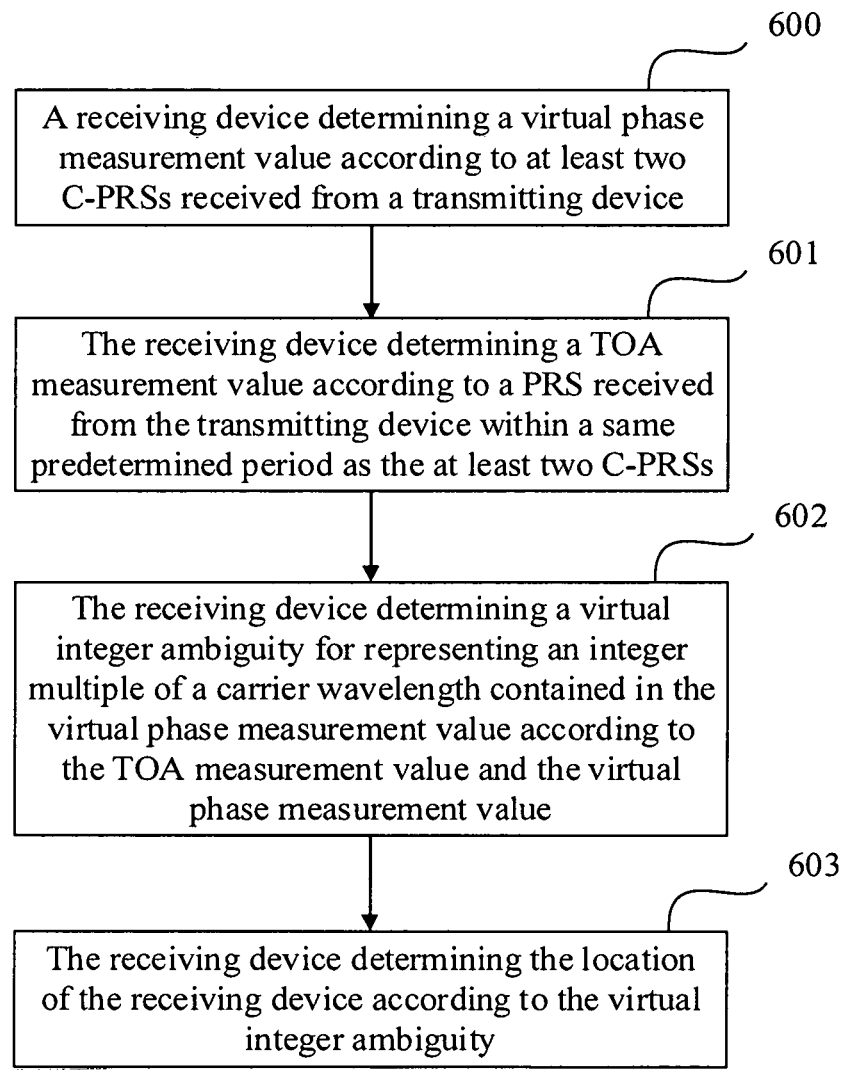
FIG. 6 is a schematic diagram of a first positioning method according to an embodiment of the present application.

As shown in FIG. 6, a positioning method provided by an embodiment of the present application specifically includes the following steps.

Step 600: a receiving device determining a virtual phase measurement value according to at least two C-PRSs received from a transmitting device.

Step 601: the receiving device determining a TOA measurement value according to a PRS received from the transmitting device within a same predetermined period as the at least two C-PRSs.

Step 602: the receiving device determining a virtual integer ambiguity for representing an integer multiple of a carrier wavelength contained in the virtual phase measurement value according to the TOA measurement value and the virtual phase measurement value.

Step 603: the receiving device determining the location of the receiving device according to the virtual integer ambiguity.

In one embodiment, the step in which the receiving device determines a TOA measurement value according to a PRS received from the transmitting device within a same predetermined period as the at least two C-PRSs includes that:
  when the receiving device receives a PRS from a transmitting device, determining a non-differential TOA measurement value according to the PRS through a TOA measurement algorithm operation; or
  when the receiving device receives PRSs from at least two transmitting devices and one of the at least two transmitting devices is a reference transmitting device, obtaining at least two non-differential TOA measurement values according to the PRSs through a TOA measurement algorithm operation, and determining a single-differential TOA measurement value by performing a differential operation on the at least two non-differential TOA measurement values of the reference transmitting device and non-reference transmitting device; or
  when at least two transmitting devices transmit PRSs to multiple receiving devices and one of the at least two transmitting devices is a reference transmitting device and one of the multiple receiving devices is a reference receiving device with a known location, the receiving device performs TOA measurement algorithm operations and single differential operations on the PRSs transmitted by the at least two transmitting devices to obtain a single-differential TOA measurement value of each of the multiple receiving devices, and then performs a differential operation on the single-differential TOA measurement value of each of the multiple receiving devices to obtain a dual-differential TOA measurement value.

In one embodiment, the step in which the receiving device determines a virtual phase measurement value according to at least two C-PRSs received from a transmitting device includes that:
  the receiving device determines an actual phase measurement value corresponding to each C-PRS; and
  the receiving device determines the virtual phase measurement value according to determined actual phase measurement values corresponding to the at least two C-PRSs.

In one embodiment, the step in which the receiving device determines an actual phase measurement value corresponding to each C-PRS includes:
  when the receiving device receives at least one C-PRS from a transmitting device, determining a non-differential actual phase measurement value according to the at least one C-PRS through a carrier phase measurement algorithm operation; or
  when the receiving device receives the at least two C-PRSs from at least two transmitting devices and one of the at least two transmitting devices is a reference transmitting device, obtaining at least two non-differential carrier phase measurement values according to the at least two C-PRSs through carrier phase measurement algorithm operations, and determining a single-differential actual phase measurement value by performing a differential operation on the at least two non-differential carrier phase measurement values of the reference transmitting device and non-reference transmitting device; or
  when at least two transmitting devices transmit the at least two C-PRSs to multiple receiving devices and one of the at least two transmitting devices is a reference transmitting device and one of the multiple receiving devices is a reference receiving device with a known location, the receiving device performing carrier phase measurement algorithm operations and single differential operations on the at least two C-PRSs transmitted by the at least two transmitting devices to obtain a single-differential carrier phase measurement value of each of the multiple receiving devices, and then performing a differential operation on the single-differential carrier phase measurement value of each of the multiple receiving devices to obtain a dual-differential actual phase measurement value.

In one embodiment, the step in which the receiving device determines the virtual phase measurement value according to determined actual phase measurement values corresponding to the at least two C-PRSs includes that:
  the receiving device performs a weighting process of the actual phase measurement value corresponding to each C-PRS with a wavelength-related weighting coefficient; and
  the receiving device accumulates and combines all results of the weighting processes to obtain the virtual phase measurement value.

In one embodiment, the step in which the receiving device determines a virtual integer ambiguity for representing an integer multiple of a carrier wavelength contained in the virtual phase measurement value according to the TOA measurement value and the virtual phase measurement value includes that:
  the receiving device determines the virtual integer ambiguity according to the TOA measurement value, the virtual phase measurement value, and a virtual wavelength obtained by weighting a wavelength of each of the at least two C-PRSs and a wavelength-related weighting coefficient.

In one embodiment, the step in which the receiving device determines the location of the receiving device according to the virtual integer ambiguity includes that:
  the receiving device determines a real integer ambiguity according to the virtual integer ambiguity; and
  the receiving device determines the location of the receiving device according to the real integer ambiguity.

In one embodiment, the step in which the receiving device determines a real integer ambiguity according to the virtual integer ambiguity includes that:
  the receiving device uses the virtual integer ambiguity as the real integer ambiguity; or
  the receiving device determines the real integer ambiguity according to the virtual integer ambiguity, the virtual phase measurement value, a wavelength of each C-PRS of the at least two C-PRSs, and a phase measurement value corresponding to the C-PRS.

Based on the same inventive concept, an embodiment of the present application further provides a positioning method. Since the device corresponding to this method is the positioning device of the embodiments of the present application and the principle solving the problem of this method is similar to that of this device, the implementations of this method can refer to the implementations of the device, and the repeated description thereof will be omitted here.

Figure 7:
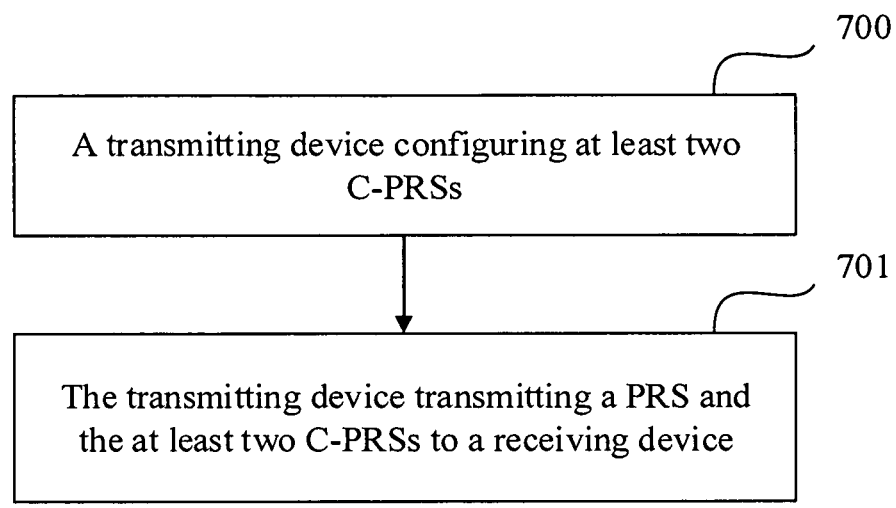
FIG. 7 is a schematic diagram of a second positioning method according to an embodiment of the present application.

As shown in FIG. 7, an embodiment of the present application further provides a positioning method, which includes following steps.

Step 700: a transmitting device configuring at least two C-PRSs.

Step 701: the transmitting device transmitting a PRS and the at least two C-PRSs to a receiving device.

In one embodiment, a ratio of the magnitude of a virtual phase measurement error determined by wavelengths of the at least two C-PRSs configured by the transmitting device to the magnitude of a TOA measurement error pre-fined, or pre-configured by network is within a set range.

In the above-mentioned embodiments of the present application, in order to realize the functions in the above methods provided in the embodiments of the present application, the transmitting device and the receiving device may include hardware structures and/or software modules, and implement the above-mentioned functions in the form of hardware structure, software module, or hardware structure plus software module. Whether a function among the above-mentioned functions is executed by way of hardware structure, software module, or hardware structure plus software module depends on the specific application and design constraints of the embodiments.

Figure 8:
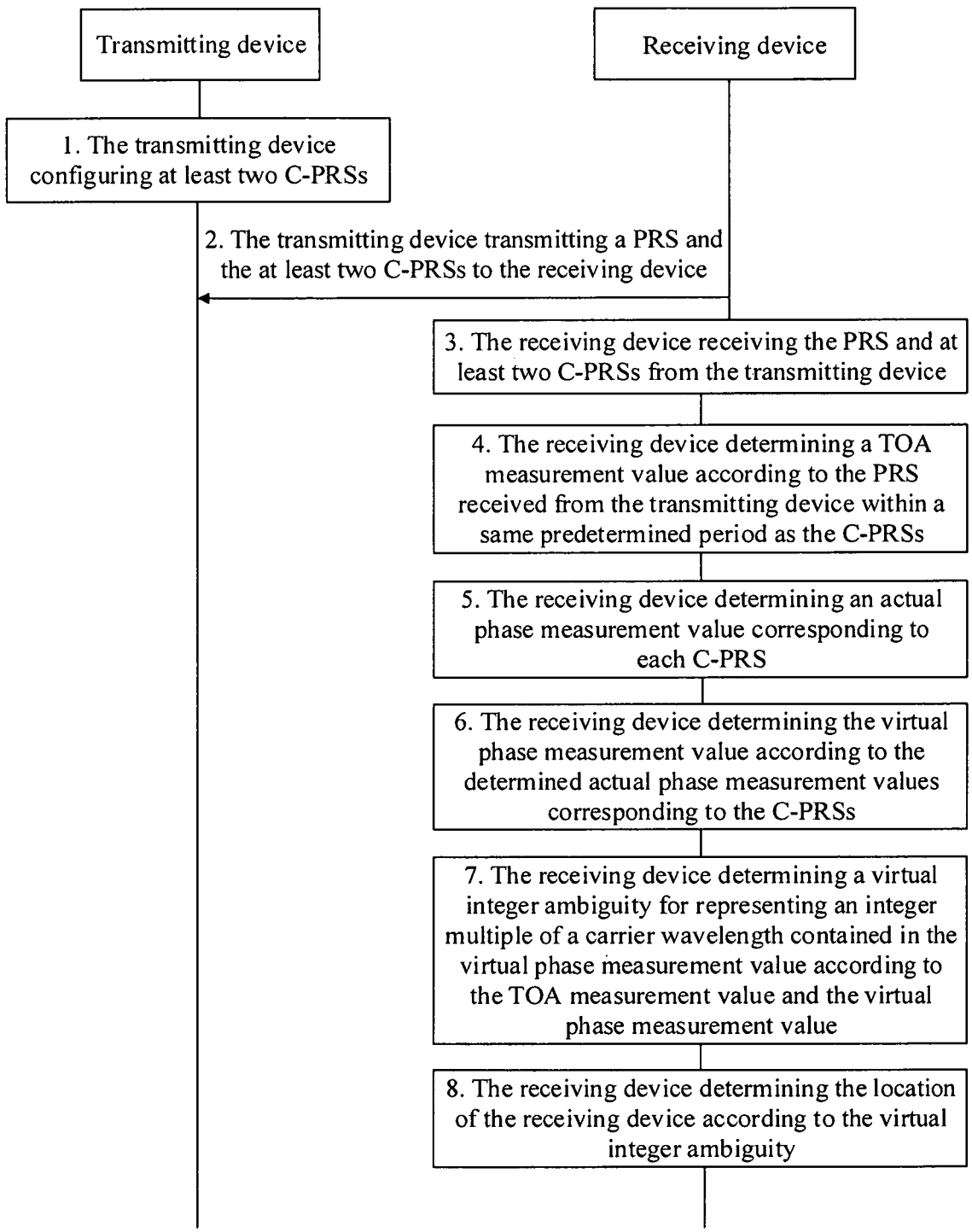
FIG. 8 is a schematic flowchart of a positioning method according to an embodiment of the present application.

As shown in FIG. 8, a positioning method provided by an embodiment of the present application specifically includes the following steps.

Step 1: a transmitting device configuring at least two C-PRSs.

Step 2: the transmitting device transmitting a PRS and the at least two C-PRSs to a receiving device.

Step 3: the receiving device receiving the PRS and the at least two C-PRSs from the transmitting device.

Step 4: the receiving device determining a TOA measurement value according to the PRS received from the transmitting device within a same predetermined period as the C-PRSs.

Step 5: the receiving device determining an actual phase measurement value corresponding to each C-PRS.

Step 6: the receiving device determining the virtual phase measurement value according to the determined actual phase measurement values corresponding to the C-PRSs.

Step 7: the receiving device determining a virtual integer ambiguity for representing an integer multiple of a carrier wavelength contained in the virtual phase measurement value according to the TOA measurement value and the virtual phase measurement value.

Step 8: the receiving device determining the location of the receiving device according to the virtual integer ambiguity.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A positioning method, comprising:
determining, by a receiving device, a virtual phase measurement value according to at least two received Carrier phase Positioning Reference Signals (C-PRSs);
determining, by the receiving device, a Time Of Arrival (TOA) measurement value according to a Positioning Reference Signal (PRS) received within a same predetermined period as the at least two C-PRSs;
determining, by the receiving device, a virtual integer ambiguity for representing an integer multiple of a carrier wavelength contained in the virtual phase measurement value according to the TOA measurement value and the virtual phase measurement value; and
determining, by the receiving device, a location of the receiving device according to the virtual integer ambiguity.

2. The method of claim 1, wherein the determining, by the receiving device, the TOA measurement value according to the PRS, received within the same predetermined period as the at least two C-PRSs, comprises:
when the receiving device receives a PRS from a transmitting device, determining a non-differential TOA measurement value according to the PRS through a TOA measurement algorithm operation; or
when the receiving device receives PRSs from at least two transmitting devices, one of the at least two transmitting devices is a reference transmitting device, and one of the at least two transmitting devices other than the reference transmitting device is a non-reference transmitting device, obtaining at least two non-differential TOA measurement values according to the PRSs through a TOA measurement algorithm operation, and determining a single-differential TOA measurement value by performing a differential operation on the at least two non-differential TOA measurement values of the reference transmitting device and the non-reference transmitting device; or
when at least two transmitting devices transmit PRSs to multiple receiving devices and one of the at least two transmitting devices is a reference transmitting device and one of the multiple receiving devices is a reference receiving device with a known location, performing, by each of the multiple receiving devices, TOA measurement algorithm operations and single differential operations on the PRSs transmitted by the at least two transmitting devices to obtain a single-differential TOA measurement value of each of the multiple receiving devices, and then performing a differential operation on the single-differential TOA measurement value of each of the multiple receiving devices to obtain a dual-differential TOA measurement value.

3. The method of claim 1, wherein the determining, by the receiving device, the virtual phase measurement value according to the at least two received C-PRSs, comprises:
   determining, by the receiving device, an actual phase measurement value corresponding to each C-PRS of the at least two C-PRSs; and
   determining, by the receiving device, the virtual phase measurement value according to determined actual phase measurement values corresponding to the at least two C-PRSs.

4. The method of claim 3, wherein the determining, by the receiving device, the actual phase measurement value corresponding to each C-PRS of the at least two C-PRSs, comprises:
   when the receiving device receives at least one C-PRS from a transmitting device, determining a non-differential actual phase measurement value according to the at least one C-PRS through a carrier phase measurement algorithm operation; or
   when the receiving device receives the at least two C-PRSs from at least two transmitting devices, one of the at least two transmitting devices is a reference transmitting device, and one of the at least two transmitting devices other than the reference transmitting device is a non-reference transmitting device, obtaining at least two non-differential carrier phase measurement values according to the at least two C-PRSs through carrier phase measurement algorithm operations, and determining a single-differential actual phase measurement value by performing a differential operation on the at least two non-differential carrier phase measurement values of the reference transmitting device and the non-reference transmitting device; or
   when at least two transmitting devices transmit the at least two C-PRSs to multiple receiving devices and one of the at least two transmitting devices is a reference transmitting device and one of the multiple receiving devices is a reference receiving device with a known location, performing, by each of the multiple receiving devices, carrier phase measurement algorithm operations and single differential operations on the at least two C-PRSs transmitted by the at least two transmitting devices to obtain a single-differential carrier phase measurement value of each of the multiple receiving devices, and then performing a differential operation on the single-differential carrier phase measurement value of each of the multiple receiving devices to obtain a dual-differential actual phase measurement value.

5. The method of claim 3, wherein the determining, by the receiving device, the virtual phase measurement value according to the determined actual phase measurement values corresponding to the at least two C-PRSs, comprises:
   performing, by the receiving device, a weighting process of the actual phase measurement value corresponding to each C-PRS of the at least two C-PRSs with a wavelength-related weighting coefficient; and
   accumulating and combining, by the receiving device, all results of weighting processes to obtain the virtual phase measurement value.

6. The method of claim 1, wherein the determining, by the receiving device, the virtual integer ambiguity for representing the integer multiple of the carrier wavelength contained in the virtual phase measurement value according to the TOA measurement value and the virtual phase measurement value, comprises:
   determining, by the receiving device, the virtual integer ambiguity according to the TOA measurement value, the virtual phase measurement value, and a virtual wavelength obtained by weighting a wavelength of each of the at least two C-PRSs and a wavelength-related weighting coefficient.

7. The method of claim 1, wherein the determining, by the receiving device, the location of the receiving device according to the virtual integer ambiguity, comprises:
   determining, by the receiving device, a real integer ambiguity according to the virtual integer ambiguity; and
   determining, by the receiving device, the location of the receiving device according to the real integer ambiguity.

8. The method of claim 7, wherein the determining, by the receiving device, the real integer ambiguity according to the virtual integer ambiguity, comprises:
   using, by the receiving device, the virtual integer ambiguity as the real integer ambiguity; or
   determining, by the receiving device, the real integer ambiguity according to the virtual integer ambiguity, the virtual phase measurement value, a wavelength of each C-PRS of the at least two C-PRSs, and a phase measurement value corresponding to the C-PRS.

9. A positioning method, comprising:
   configuring, by a transmitting device, at least two C-PRSs; and
   transmitting, by the transmitting device, a PRS and the at least two C-PRSs to a receiving device;
   wherein the PRS is transmitted within a same predetermined period as the at least two C-PRSs;
   the at least two C-PRSs are configured to determine a virtual phase measurement value;
   the PRS is configured to determine a Time Of Arrival (TOA) measurement value;
   the TOA measurement value and the virtual phase measurement value are configured to determine a virtual integer ambiguity for representing an integer multiple of a carrier wavelength contained in the virtual phase measurement value; and
   the virtual integer ambiguity is configured to determine a location of the receiving device.

10. The method of claim 9, wherein a ratio of a first magnitude to a second magnitude is within a set range;
    the first magnitude is a magnitude of a virtual phase measurement error determined by wavelengths of the at least two C-PRSs;
    the second magnitude is a magnitude of a TOA measurement error pre-defined, or a TOA measurement error pre-configured by network.

11. A positioning device, comprising: a processor, a memory and a transceiver;
    wherein the processor is configured to read a program in the memory and perform the method of claim 9 comprising:
    configuring at least two C-PRSs; and
    transmitting a PRS and the at least two C-PRSs to a receiving device;
    wherein the PRS is transmitted within a same predetermined period as the at least two C-PRSs;

the at least two C-PRSs are configured to determine a virtual phase measurement value;

the PRS is configured to determine a Time Of Arrival (TOA) measurement value;

the TOA measurement value and the virtual phase measurement value are configured to determine a virtual integer ambiguity for representing an integer multiple of a carrier wavelength contained in the virtual phase measurement value; and the virtual integer ambiguity is configured to determine a location of the receiving device.

12. The device of claim 11, wherein a ratio of a first magnitude to a second magnitude is within a set range;

the first magnitude is a magnitude of a virtual phase measurement error determined by wavelengths of the at least two C-PRSs;

the second magnitude is a magnitude of a TOA measurement error pre-defined, or a TOA measurement error pre-configured by network.

13. A positioning device, comprising: a processor, a memory and a transceiver;

wherein the processor is configured to read a program stored in the memory and perform:

determining a virtual phase measurement value according to at least two received C-PRSs;

determining a TOA measurement value according to a PRS received within a same predetermined period as the at least two C-PRSs;

determining a virtual integer ambiguity for representing an integer multiple of a carrier wavelength contained in the virtual phase measurement value according to the TOA measurement value and the virtual phase measurement value; and determining a location of the receiving device according to the virtual integer ambiguity.

14. The device of claim 13, wherein the processor is configured to:

when a PRS is received from a transmitting device, determine a non-differential TOA measurement value according to the PRS through a TOA measurement algorithm operation; or when PRSs are received from at least two transmitting devices, one of the at least two transmitting devices is a reference transmitting device, and one of the at least two transmitting devices other than the reference transmitting device is a non-reference transmitting device, obtain at least two non-differential TOA measurement values according to the PRSs through a TOA measurement algorithm operation, and determine a single-differential TOA measurement value by performing a differential operation on the at least two non-differential TOA measurement values of the reference transmitting device and the non-reference transmitting device; or when PRSs are received by multiple receiving devices from at least two transmitting devices and one of the at least two transmitting devices is a reference transmitting device and one of the multiple receiving devices is a reference receiving device with a known location, perform TOA measurement algorithm operations and single differential operations on the PRSs transmitted by the at least two transmitting devices to obtain a single-differential TOA measurement value of each of the multiple receiving devices, and then perform a differential operation on the single-differential TOA measurement value of each of the multiple receiving devices to obtain a dual-differential TOA measurement value.

15. The device of claim 13, wherein the processor is configured to:

determine an actual phase measurement value corresponding to each C-PRS of the at least two C-PRSs; and determine the virtual phase measurement value according to determined actual phase measurement values corresponding to the at least two C-PRSs.

16. The device of claim 15, wherein the processor is configured to:

when at least one C-PRS is received from a transmitting device, determine a non-differential actual phase measurement value according to the at least one C-PRS through a carrier phase measurement algorithm operation; or when the at least two C-PRSs are received from at least two transmitting devices, one of the at least two transmitting devices is a reference transmitting device, and one of the at least two transmitting devices other than the reference transmitting device is a non-reference transmitting device, obtain at least two non-differential carrier phase measurement values according to the at least two C-PRSs through carrier phase measurement algorithm operations, and determine a single-differential actual phase measurement value by performing a differential operation on the at least two non-differential carrier phase measurement values of the reference transmitting device and the non-reference transmitting device; or when the at least two C-PRSs are received by multiple receiving devices from at least two transmitting devices and one of the at least two transmitting devices is a reference transmitting device and one of the multiple receiving devices is a reference receiving device with a known location, perform carrier phase measurement algorithm operations and single differential operations on the at least two C-PRSs transmitted by the at least two transmitting devices to obtain a single-differential carrier phase measurement value of each of the multiple receiving devices, and then perform a differential operation on the single-differential carrier phase measurement value of each of the multiple receiving devices to obtain a dual-differential actual phase measurement value.

17. The device of claim 15, wherein the processor is configured to:

perform a weighting process of the actual phase measurement value corresponding to each C-PRS of the at least two C-PRSs with a wavelength-related weighting coefficient; and accumulate and combine all results of weighting processes to obtain the virtual phase measurement value.

18. The device of claim 13, wherein the processor is configured to:

determine the virtual integer ambiguity according to the TOA measurement value, the virtual phase measurement value, and a virtual wavelength obtained by weighting a wavelength of each of the at least two C-PRSs and a wavelength-related weighting coefficient.

19. The device of claim 13, wherein the processor is configured to:
- determine a real integer ambiguity according to the virtual integer ambiguity; and
- determine the location of the receiving device according to the real integer ambiguity.

20. The device of claim 19, wherein the processor is configured to:
- use the virtual integer ambiguity as the real integer ambiguity; or
- determine the real integer ambiguity according to the virtual integer ambiguity, the virtual phase measurement value, a wavelength of each C-PRS of the at least two C-PRSs, and a phase measurement value corresponding to the C-PRS.

* * * * *